United States Patent
Shinohara

(10) Patent No.: US 7,453,654 B2
(45) Date of Patent: Nov. 18, 2008

(54) IMAGING LENS

(75) Inventor: Yoshikazu Shinohara, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/705,778

(22) Filed: Feb. 14, 2007

(65) Prior Publication Data
US 2007/0188891 A1 Aug. 16, 2007

(30) Foreign Application Priority Data
Feb. 15, 2006 (JP) .......................... P2006-038115

(51) Int. Cl.
G02B 9/34 (2006.01)
G02B 3/02 (2006.01)
G02B 9/00 (2006.01)

(52) U.S. Cl. .................. 359/773; 359/774; 359/715; 359/738

(58) Field of Classification Search .............. 359/773, 359/774, 771, 772, 708, 715, 738–740
See application file for complete search history.

(56) References Cited

U.S. PATENT DOCUMENTS 7,206,143 B2 * 4/2007 Kamo et al. ............... 359/771
2002/0181121 A1 12/2002 Kawakami
2005/0030645 A1 2/2005 Do
2007/0008625 A1 1/2007 Park et al.

FOREIGN PATENT DOCUMENTS

| CN | 18922279 A | 1/2007 |
| EP | 1-703-309 A1 | 9/2006 |
| JP | 2002-365529 A | 12/2002 |
| JP | 2005-24889 A | 1/2005 |
| JP | 2005-55751 A | 3/2005 |
| JP | 2005-208236 A | 8/2005 |

OTHER PUBLICATIONS

Wikipedia, The Free Online Encyclopedia, May 9, 2007, Internet pp. 1-10, XP-002433019.

* cited by examiner

Primary Examiner—William C. Choi
Assistant Examiner—Jack Dinh
(74) Attorney, Agent, or Firm—Birch, Stewart, Kolasch and Birch, LLP

(57) ABSTRACT

An imaging lens is provided and has, in order from the object side, a first lens of a positive lens having a convex surface on the object side thereof; a second lens in a meniscus shape having a concave surface on an image side thereof; a third lens in a meniscus shape having a convex surface on the image side thereof; and a fourth lens of a positive or negative lens, both surfaces of the fourth lens being aspheric and the fourth lens having a concave surface on the image side and in a vicinity of an optical axis of the fourth lens. The Abbe numbers of the first and second lenses as well as the focal distances of the first to fourth lenses satisfies specific conditions.

31 Claims, 15 Drawing Sheets

FIG. 5A

| | BASIC LENS DATA OF EXAMPLE 1 | | | | |
|---|---|---|---|---|---|
| | Si (SURFACE NUMBER) | Ri (RADIUS OF CURVATURE) | Di (SURFACE INTERVAL) | Ndi (REFRACTIVE INDEX) | νdj (ABBE NUMBER) |
| | 1 (STOP) | – | −0.08 | 1.0 | |
| G1 | 2 | 2.4378 | 0.77799 | 1.511558 | 56 |
| G1 | 3 | −4.2836 | 0.16072 | 1.0 | |
| G2 | 4 | −156.3407 | 0.5 | 1.609211 | 27.2 |
| G2 | 5 | 3.3825 | 0.89404 | 1.0 | |
| G3 | 6 | −3.7036 | 0.83135 | 1.511558 | 56 |
| G3 | 7 | −1.5403 | 0.10012 | 1.0 | |
| G4 | 8 | 2.768 | 0.70905 | 1.511558 | 56 |
| G4 | 9 | 1.1137 | 0.6 | 1.0 | |
| GC | 10 | ∞ | 0.3 | 1.518249 | 64.1 |
| GC | 11 | ∞ | 0.7454 | 1.0 | |

FIG. 5B

| ASPHERIC SURFACE DATA OF EXAMPLE 1 | | | | |
|---|---|---|---|---|
| ASPHERIC SURFACE COEFFICIENT | SURFACE NUMBER | | | |
| | SECOND SURFACE | THIRD SURFACE | FOURTH SURFACE | FIFTH SURFACE |
| KA | −0.477047 | −6.767411 | 50.019288 | −5.224047 |
| $B_3$ | 5.6E−03 | 6.8E−03 | 5.7E−03 | 5.4E−02 |
| $B_4$ | −1.6E−02 | 6.0E−03 | 5.8E−02 | −1.1E−01 |
| $B_5$ | −2.7E−03 | −1.3E−02 | −6.6E−02 | 2.3E−01 |
| $B_6$ | 1.4E−02 | −2.0E−02 | 6.7E−02 | −1.4E−01 |
| $B_7$ | −3.3E−03 | −2.4E−02 | −1.2E−01 | −9.9E−02 |
| $B_8$ | −8.7E−03 | −2.2E−02 | −7.6E−02 | 5.0E−02 |
| $B_9$ | −2.5E−02 | 8.2E−04 | 2.0E−01 | 7.2E−02 |
| $B_{10}$ | 8.1E−03 | 2.5E−02 | −6.1E−02 | −3.4E−02 |
| | SIXTH SURFACE | SEVENTH SURFACE | EIGHTH SURFACE | NINTH SURFACE |
| KA | 5.2219879 | −5.445867 | −49.67293 | −4.521068 |
| $B_3$ | 2.0E−02 | −1.9E−01 | −1.1E−01 | 1.5E−02 |
| $B_4$ | 1.6E−02 | 4.5E−02 | −8.0E−05 | −1.3E−01 |
| $B_5$ | −4.4E−03 | 4.6E−02 | −2.3E−02 | 7.2E−02 |
| $B_6$ | 2.9E−02 | −1.1E−02 | 7.2E−03 | −9.9E−03 |
| $B_7$ | −1.6E−02 | −4.6E−03 | 1.0E−02 | −4.9E−03 |
| $B_8$ | −9.2E−03 | 1.6E−03 | −1.5E−03 | 9.5E−04 |
| $B_9$ | 1.3E−02 | 3.6E−03 | −6.1E−04 | 6.3E−04 |
| $B_{10}$ | −6.7E−03 | −9.3E−04 | −3.4E−05 | −2.0E−04 |

FIG. 6A

| | BASIC LENS DATA OF EXAMPLE 2 | | | | |
|---|---|---|---|---|---|
| | Si (SURFACE NUMBER) | Ri (RADIUS OF CURVATURE) | Di (SURFACE INTERVAL) | Ndi (REFRACTIVE INDEX) | νdj (ABBE NUMBER) |
| | 1 (STOP) | – | −0.08 | 1.0 | |
| G1 | 2 | 2.4013 | 0.82562 | 1.511558 | 56 |
| | 3 | −4.5901 | 0.10618 | 1.0 | |
| G2 | 4 | 13.0546 | 0.5 | 1.609211 | 27.2 |
| | 5 | 2.742 | 0.83592 | 1.0 | |
| G3 | 6 | −5.023 | 0.92677 | 1.511558 | 56 |
| | 7 | −1.2325 | 0.10012 | 1.0 | |
| G4 | 8 | 4.6646 | 0.56823 | 1.511558 | 56 |
| | 9 | 0.9869 | 0.6 | 1.0 | |
| GC | 10 | ∞ | 0.3 | 1.518249 | 64.1 |
| | 11 | ∞ | 0.70527 | 1.0 | |

FIG. 6B

| ASPHERIC SURFACE DATA OF EXAMPLE 2 | | | | |
|---|---|---|---|---|
| ASPHERIC SURFACE COEFFICIENT | SURFACE NUMBER | | | |
| | SECOND SURFACE | THIRD SURFACE | FOURTH SURFACE | FIFTH SURFACE |
| KA | 0.3119152 | −23.9423 | −46.43464 | −5.469447 |
| $B_3$ | 6.2E−04 | 1.6E−03 | 7.1E−03 | 5.3E−02 |
| $B_4$ | −8.4E−03 | −2.2E−03 | 3.5E−02 | −1.1E−01 |
| $B_5$ | −1.2E−02 | −3.4E−02 | −6.2E−02 | 2.3E−01 |
| $B_6$ | −2.8E−03 | −1.1E−02 | 8.3E−02 | −1.3E−01 |
| $B_7$ | −5.9E−03 | −5.8E−03 | −9.7E−02 | −8.7E−02 |
| $B_8$ | 3.8E−03 | 6.4E−03 | −5.7E−02 | 5.7E−02 |
| $B_9$ | −6.6E−03 | 8.1E−03 | 2.0E−01 | 7.4E−02 |
| $B_{10}$ | 2.0E−03 | 3.3E−03 | −9.0E−02 | −4.0E−02 |
| | SIXTH SURFACE | SEVENTH SURFACE | EIGHTH SURFACE | NINTH SURFACE |
| KA | 7.5317652 | −7.863374 | −46.10612 | −4.684725 |
| $B_3$ | 2.8E−02 | −1.8E−01 | −1.3E−01 | −1.5E−02 |
| $B_4$ | −3.7E−03 | 4.7E−02 | −3.9E−04 | −1.1E−01 |
| $B_5$ | −2.3E−04 | 4.5E−02 | −2.0E−02 | 7.4E−02 |
| $B_6$ | 2.8E−02 | −1.2E−02 | 8.6E−03 | −1.4E−02 |
| $B_7$ | −2.0E−02 | −4.9E−03 | 1.1E−02 | −4.9E−03 |
| $B_8$ | −1.2E−02 | 1.5E−03 | −1.5E−03 | 1.4E−03 |
| $B_9$ | 1.3E−02 | 3.5E−03 | −6.5E−04 | 7.0E−04 |
| $B_{10}$ | −5.1E−03 | −1.0E−03 | −8.6E−05 | −2.5E−04 |

FIG. 7A

| | Si (SURFACE NUMBER) | Ri (RADIUS OF CURVATURE) | Di (SURFACE INTERVAL) | Ndi (REFRACTIVE INDEX) | νdj (ABBE NUMBER) |
|---|---|---|---|---|---|
| | \multicolumn{5}{c|}{BASIC LENS DATA OF EXAMPLE 3} | | | | |

| | Si (SURFACE NUMBER) | Ri (RADIUS OF CURVATURE) | Di (SURFACE INTERVAL) | Ndi (REFRACTIVE INDEX) | νdj (ABBE NUMBER) |
|---|---|---|---|---|---|
| | 1 (STOP) | – | −0.08 | 1.0 | |
| G1 | 2 | 2.7286 | 0.89778 | 1.511558 | 56 |
| | 3 | −6.4332 | 0.1007 | 1.0 | |
| G2 | 4 | 4.6858 | 0.5 | 1.609211 | 27.2 |
| | 5 | 2.0768 | 0.75304 | 1.0 | |
| G3 | 6 | −5.0471 | 1.03235 | 1.533308 | 55.5 |
| | 7 | −1.069 | 0.10014 | 1.0 | |
| G4 | 8 | 6.0739 | 0.50108 | 1.533308 | 55.5 |
| | 9 | 1.0395 | 0.6 | 1.0 | |
| GC | 10 | ∞ | 0.3 | 1.518249 | 64.1 |
| | 11 | ∞ | 1.11055 | 1.0 | |

FIG. 7B

| ASPHERIC SURFACE DATA OF EXAMPLE 3 | | | | |
|---|---|---|---|---|
| ASPHERIC SURFACE COEFFICIENT | SURFACE NUMBER | | | |
| | SECOND SURFACE | THIRD SURFACE | FOURTH SURFACE | FIFTH SURFACE |
| KA | −3.371655 | −25.58211 | −49.97134 | −2.68979 |
| $B_3$ | 5.3E−03 | −6.7E−02 | −5.5E−02 | 2.5E−02 |
| $B_4$ | −2.0E−02 | 1.1E−02 | 1.7E−02 | −1.2E−01 |
| $B_5$ | 6.7E−02 | −6.4E−02 | −6.2E−02 | 1.9E−01 |
| $B_6$ | −3.5E−02 | −1.4E−02 | 3.7E−02 | −1.2E−01 |
| $B_7$ | −5.8E−02 | 1.6E−02 | −1.1E−01 | −6.0E−02 |
| $B_8$ | −6.1E−02 | 3.0E−02 | −6.3E−03 | 5.3E−02 |
| $B_9$ | 1.6E−01 | 1.2E−02 | 2.6E−01 | 5.3E−02 |
| $B_{10}$ | −7.0E−02 | −1.4E−02 | −1.4E−01 | −3.1E−02 |
| | SIXTH SURFACE | SEVENTH SURFACE | EIGHTH SURFACE | NINTH SURFACE |
| KA | 6.7484195 | −4.128091 | −27.61143 | −4.652555 |
| $B_3$ | 1.8E−02 | −9.9E−02 | −1.3E−01 | −5.9E−02 |
| $B_4$ | −4.4E−03 | 5.0E−03 | 1.8E−02 | −8.8E−02 |
| $B_5$ | 1.9E−02 | 2.9E−02 | −2.1E−02 | 7.8E−02 |
| $B_6$ | 2.7E−02 | −8.8E−03 | 4.5E−03 | −2.1E−02 |
| $B_7$ | −2.2E−02 | 1.7E−03 | 8.3E−03 | −6.6E−03 |
| $B_8$ | −1.0E−02 | 5.3E−03 | −2.4E−03 | 2.5E−03 |
| $B_9$ | 1.6E−02 | 3.8E−03 | −5.7E−04 | 1.3E−03 |
| $B_{10}$ | −7.2E−03 | −2.9E−03 | 3.4E−04 | −5.1E−04 |

FIG. 8A

| | BASIC LENS DATA OF EXAMPLE 4 | | | | |
|---|---|---|---|---|---|
| | Si (SURFACE NUMBER) | Ri (RADIUS OF CURVATURE) | Di (SURFACE INTERVAL) | Ndi (REFRACTIVE INDEX) | νdj (ABBE NUMBER) |
| G1 | 1 | 2.5039 | 0.90558 | 1.511558 | |
| | 2 | −6.4 | 0.05 | 1.0 | 56 |
| | 3 (STOP) | − | 0.10091 | 1.0 | |
| G2 | 4 | 6.1585 | 0.5 | 1.609211 | 27.2 |
| | 5 | 2.0731 | 0.69273 | 1.0 | |
| G3 | 6 | −5.742 | 1.21344 | 1.511558 | 56 |
| | 7 | −0.9367 | 0.10013 | 1.0 | |
| G4 | 8 | −107.9756 | 0.5011 | 1.511558 | 56 |
| | 9 | 1.1234 | 0.6 | 1.0 | |
| GC | 10 | ∞ | 0.3 | 1.518249 | 64.1 |
| | 11 | ∞ | 1.03005 | 1.0 | |

FIG. 8B

| ASPHERIC SURFACE DATA OF EXAMPLE 4 | | | | |
|---|---|---|---|---|
| ASPHERIC SURFACE COEFFICIENT | SURFACE NUMBER | | | |
| | FIRST SURFACE | SECOND SURFACE | FOURTH SURFACE | FIFTH SURFACE |
| KA | −2.649 | −36.88663 | −17.59637 | 0.46425 |
| $B_3$ | 2.9E−03 | 4.5E−03 | 7.8E−03 | 1.7E−02 |
| $B_4$ | −1.6E−02 | 2.9E−02 | 5.6E−02 | −7.0E−02 |
| $B_5$ | 7.9E−02 | −2.3E−02 | −7.0E−02 | 1.7E−01 |
| $B_6$ | −2.0E−02 | 5.7E−03 | 5.2E−02 | −1.5E−01 |
| $B_7$ | −5.1E−02 | −4.1E−03 | −1.0E−01 | −6.5E−02 |
| $B_8$ | −5.3E−02 | −1.7E−02 | −5.6E−02 | 7.7E−02 |
| $B_9$ | 1.3E−01 | −2.8E−02 | 2.1E−01 | 7.2E−02 |
| $B_{10}$ | −5.9E−02 | 2.8E−02 | −9.2E−02 | −5.6E−02 |
| | SIXTH SURFACE | SEVENTH SURFACE | EIGHTH SURFACE | NINTH SURFACE |
| KA | 3.159711 | −2.529369 | −155.4079 | −5.513883 |
| $B_3$ | 6.1E−03 | −6.7E−03 | −5.6E−03 | −7.8E−03 |
| $B_4$ | −1.6E−03 | −3.4E−02 | −3.0E−02 | −1.3E−01 |
| $B_5$ | −1.9E−03 | 8.2E−03 | −3.1E−02 | 9.0E−02 |
| $B_6$ | 2.1E−02 | −1.8E−02 | 3.9E−03 | −2.0E−02 |
| $B_7$ | −2.0E−02 | −1.3E−03 | 8.8E−03 | −7.1E−03 |
| $B_8$ | −6.0E−03 | 5.5E−03 | −2.0E−03 | 1.9E−03 |
| $B_9$ | 1.8E−02 | 5.1E−03 | −3.8E−04 | 1.2E−03 |
| $B_{10}$ | −7.1E−03 | −1.5E−03 | 3.3E−04 | −3.7E−04 |

FIG. 9

| VALUES RELATING TO FORMULAE | | | | |
|---|---|---|---|---|
| | EXAMPLE 1 | EXAMPLE 2 | EXAMPLE 3 | EXAMPLE 4 |
| f | 4.64 | 4.54 | 4.70 | 4.70 |
| f1 | 3.16 | 3.21 | 3.87 | 3.63 |
| f2 | −5.43 | −5.80 | −6.60 | −5.38 |
| f3 | 4.56 | 2.95 | 2.33 | 2.02 |
| f4 | −4.26 | −2.58 | −2.44 | −2.17 |
| \|f2 / f1\| | 1.72 | 1.81 | 1.71 | 1.48 |
| \|f3 / f4\| | 1.07 | 1.14 | 0.95 | 0.93 |
| vd1 | 56 | 56 | 56 | 56 |
| vd2 | 27.2 | 27.2 | 27.2 | 27.2 |

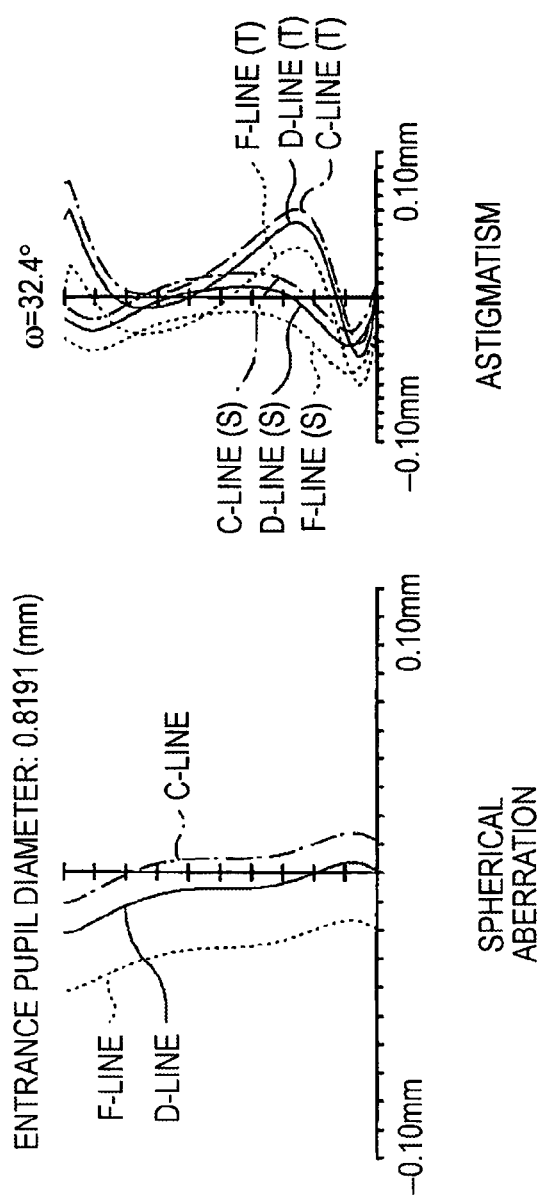

IMAGING LENS

BACKGROUND OF THE INVENTION

1. Field of the Invention

The present invention relates to an imaging lens for use in imaging equipment using an imaging element such as CCD (Charge Coupled Device) and CMOS (Complementary Metal Oxide Semiconductor).

2. Description of Related Art

An imaging element such as CCD and CMOS, recently, has been greatly reduced in size and increased in the number of pixels. For this reason, the main body of the imaging equipment and the lens mounted on the main body of the imaging equipment have been also required of reduced size and higher performance. Also, to correspond to the imaging element with pixels increased in number, the imaging lens is also requested to have a telecentric characteristic, that is, it is requested that an incident angle onto the imaging element is near to parallel to an optical axis (namely, the incident angle onto the imaging element is near to perpendicular to the imaging element). In the related art, for example, most of imaging lenses mounted on a cellular phone with a camera are composed of three lenses; however, in order to cope with the increased number of pixels, there is a tendency toward larger number of lenses. In an imaging lens disclosed in JP-2005-208236, a second lens disposed second from the object side is a negative lens, the surface of which on the object side is concave.

However, in the imaging lens disclosed in JP-2005-208236, there is room for improvement with respect to the chromatic aberration thereof and the like. Also, in an imaging lens composed of four lenses, in order to secure the telecentric characteristic, it is expected that an aperture stop is disposed on the object side as much as possible. In this case, when, as in the imaging lens provided by JP-2005-208236, the object side surface of the second lens is concave, the manufacturing sensitivity thereof is high and, therefore, for example, when the position of the lens is shifted in the manufacturing process thereof, the image surface thereof is easy to vary.

SUMMARY OF THE INVENTION

An object of an illustrative, non-limiting embodiment of the invention is to provide an imaging lens capable of realizing a lens system which can cope with the increased number of pixels, can be made compact and can provide high performance.

According to an aspect of the invention, there is provided an imaging lens comprising: in order from an object side of the imaging lens, a first lens of a positive lens having a convex surface on the object side thereof; a second lens of a negative lens in a meniscus shape having a concave surface on an image side thereof; a third lens of a positive lens in a meniscus shape having a convex surface on the image side thereof; and a fourth lens of a positive or negative lens, wherein both surfaces of the fourth lens are aspheric and the fourth lens has a concave surface on the image side in a vicinity of an optical axis of the fourth lens. The imaging lens satisfies formulae (1) to (4):

$$vd1 > 50 \quad (1)$$

$$vd2 < 30 \quad (2)$$

$$|f2/f1| > 1 \quad (3)$$

$$0.5 < |f3/f4| < 1.5 \quad (4)$$

wherein vd1 represents an Abbe number of the first lens; vd2 represents an Abbe number of the second lens; f1 represents a focal length of the first lens; f2 represents a focal length of the second lens; f3 represents a focal length of the third lens; and f4 represents a focal length of the fourth lens.

The imaging lens according to an aspect of the invention is composed of four lenses as a whole; and, the materials of the lenses, the surface shapes of the lenses and the power distributions of the respective lenses are optimized. This can provide a lens system which can cope with the increased number of pixels, can be made compact and can provide high performance. Especially, since the formulae (1) and (2) are satisfied, a correction on the longitudinal chromatic aberration and the lateral color can be effected. Also, since the formulae (3) and (4) are satisfied, not only it can secure the telecentric characteristic and can correct the longitudinal chromatic aberration and the lateral color effectively, but also it is capable of reducing the size of the whole of the lens system. Further, since the second lens is formed to have a negative meniscus shape with its concave surface on the image side, the image surface variation due to the shift of the position of the lens in the manufacturing process can be reduced, which makes it possible to provide a lens system which is excellent in manufacturing aptitude.

In the imaging lens according to an aspect of the invention, there may also be disposed an aperture stop nearer to an object than the image-side surface of the first lens. Or, there may also be disposed an aperture stop between the first and second lenses. Since the aperture stop is disposed on the relatively forward side, there can be obtained an advantage in securing the telecentric characteristic.

Also, in the imaging lens according to an aspect of the invention, the surface on the image side of the fourth lens, preferably, may be formed such that it is concave in the vicinity of an optical axis and convex at the periphery of the fourth lens. This can provides an advantage especially in correcting field curvature as well as in securing the telecentric characteristic.

BRIEF DESCRIPTION OF THE DRAWINGS

The features of the invention will appear more fully upon consideration of the exemplary embodiment of the invention, which are schematically set forth in the drawings, in which:

FIG. 5 shows lens data on the imaging lens according to Example 1 of the invention;

and, specifically, (A) shows basic lens data and (B) shows lens data on the aspheric surface;

FIG. 6 shows lens data on the imaging lens according to Example 2 of the invention;

and, specifically, (A) shows basic lens data and (B) shows lens data on the aspheric surface;

FIG. 7 shows lens data on the imaging lens according to Example 3 of the invention; and, specifically, (A) shows basic lens data and (B) shows lens data on the aspheric surface;

FIG. 8 shows lens data on the imaging lens according to Example 4 of the invention; and, specifically, (A) shows basic lens data and (B) shows lens data on the aspheric surface;

FIG. 9 shows values relating to the formulae in the respective Examples;

FIG. 10 shows an aberration view of the respective aberrations of the imaging lens according to Example 1 of the invention; and, specifically, (A) shows spherical aberrations, (B) shows astigmatisms and (C) shows distortions.

FIG. 11 shows an aberration view of the respective aberrations of the imaging lens according to Example 2 of the invention; and, specifically, (A) shows spherical aberrations, (B) shows astigmatisms and (C) shows distortions.

FIG. 12 shows an aberration view of the respective aberrations of the imaging lens according to Example 3 of the invention; and, specifically, (A) shows spherical aberrations, (B) shows astigmatisms and (C) shows distortions.

FIG. 13 shows an aberration view of the respective aberrations of the imaging lens according to Example 4 of the invention; and, specifically, (A) shows spherical aberrations, (B) shows astigmatisms and (C) shows distortions.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an aspect of the invention, there is provided an imaging lens comprising: in order from the object side, a first lens of a positive lens having a convex surface on the object side thereof; a second lens in a meniscus shape having a concave surface on an image side thereof; a third lens in a meniscus shape having a convex surface on the image side thereof; and a fourth lens of a positive or negative lens, wherein both surfaces of the fourth lens are aspheric and the fourth lens has a concave surface on the image side and in a vicinity of an optical axis of the fourth lens. Also, the materials of the lenses and the power distributions of the respective lenses are optimized. This can realize a lens system which can cope with the increased number of pixels, can be made compact and can provide high performance.

Now, description will be given below in detail of an imaging lens according to an exemplary embodiment of the invention with reference to the accompanying drawings.

Figure 1:
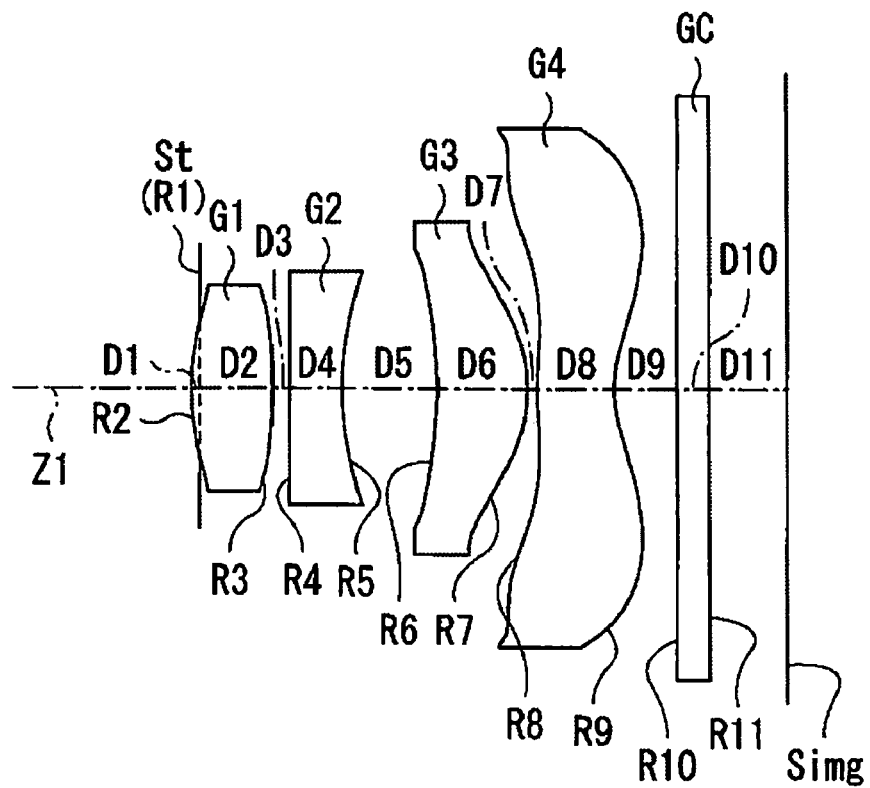
FIG. 1 is a section view of an imaging lens according to Example 1 of the invention.
Figure 2:
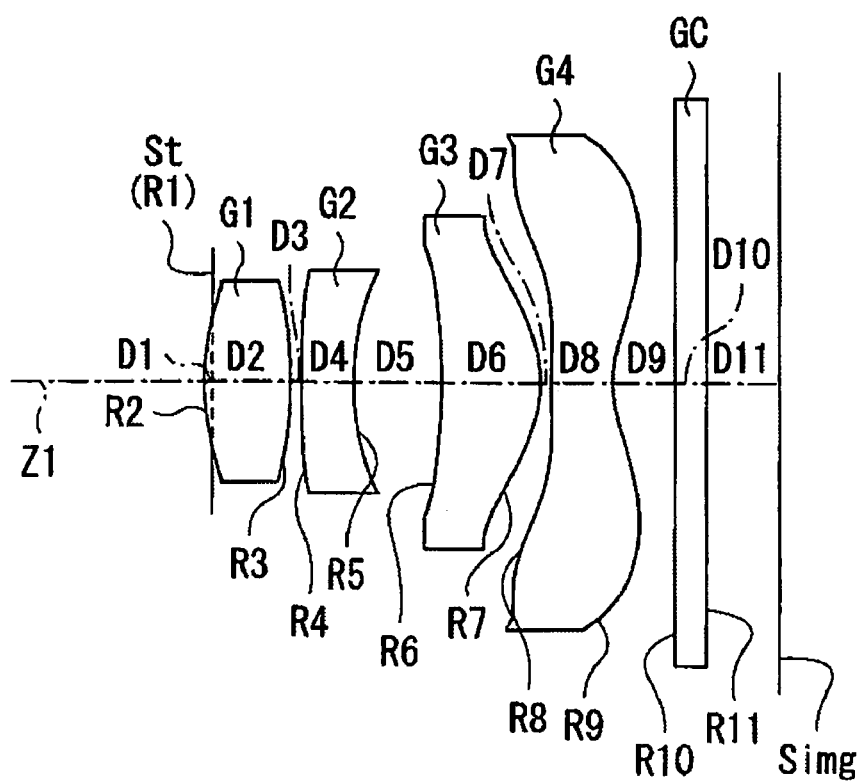
FIG. 2 is a section view of an imaging lens according to Example 2 of the invention.
Figure 3:
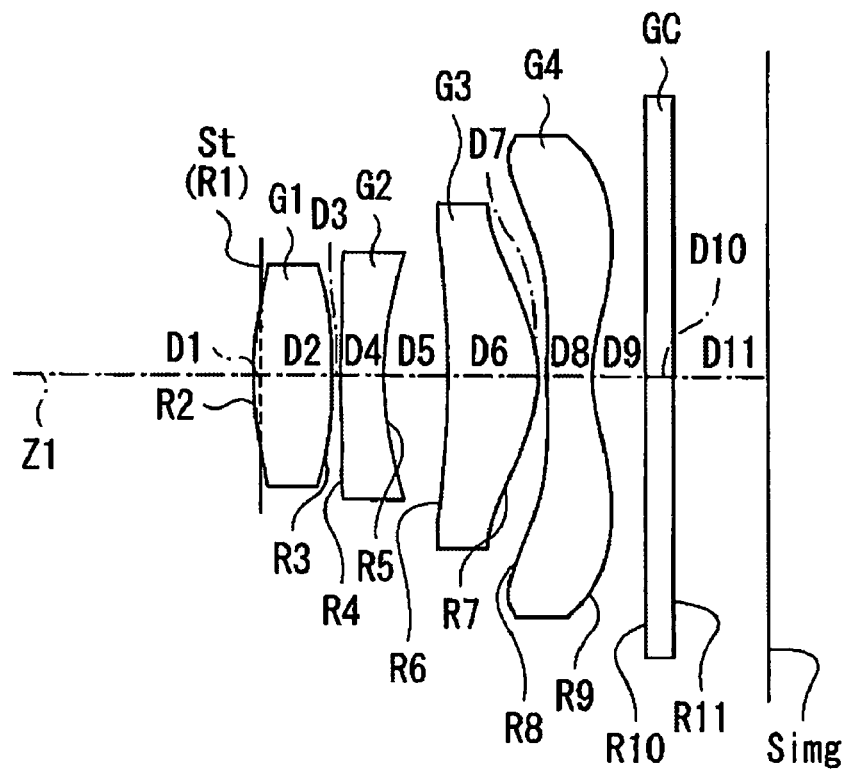
FIG. 3 is a section view of an imaging lens according to Example 3 of the invention.
Figure 4:
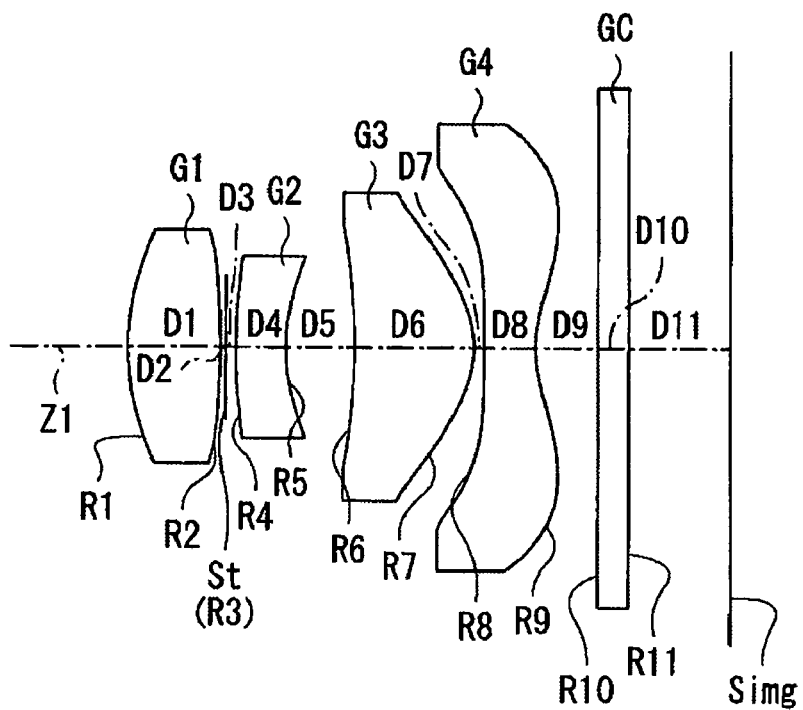
FIG. 4 is a section view of an imaging lens according to Example 4 of the invention.

FIG. 1 shows a first exemplary structure of an imaging lens according to an embodiment of the invention. This structure corresponds to the lens structure of Example 1 (FIG. 5(A), FIG. 5(B)) which will be discussed later. FIG. 2 shows a second exemplary structure of an imaging lens according to an embodiment of the invention. This structure corresponds to the lens structure of Example 2 (FIG. 6(A), FIG. 6(B)) which will be discussed later. FIG. 3 shows a third exemplary structure of an imaging lens according to an embodiment of the invention. This structure corresponds to the lens structure of Example 3 (FIG. 7(A), FIG. 7(B)) which will be discussed later. FIG. 4 shows a fourth structure of an imaging lens according to an embodiment of the invention. This structure corresponds to the lens structure of Example 4 (FIG. 8(A), FIG. 8(B)) which will be discussed later. In FIGS. 1 to 4, reference character Ri designates the radius of curvature of an i-th surface, where the surface of a composing element disposed nearest to the object is regarded as a first surface, and the numeric number of the reference character increases sequentially toward the image side (the image forming side). Reference character Di designates a surface interval between the i-th surface and the (i+1)-th surface on an optical axis Z1.

By the way, the respective structures are basically the same and thus description will be given below basically of the first structure shown in FIG. 1.

The present imaging lens is suitable for use in various kinds of imaging equipment, for example, a cellular phone, a digital still camera and a digital video camera, which use an imaging element such as CCD or CMOS. This imaging lens includes a first lens G1, a second lens G2, a third lens G3 and a fourth lens G4 in this order from the object side along the optical axis Z1. An optical aperture stop St is disposed on the front side of the first lens G1 and, more specifically, it is disposed nearer to an object than the image side of the first lens G1 along the optical axis Z1. By the way, as in the fourth structure shown in FIG. 4, the aperture stop St may also be disposed between the first lens G1 and second lens G2 along the optical axis Z1.

On the image forming surface Simg of this imaging lens, there is disposed an imaging element such as CCD. Between the fourth lens G4 and the imaging element, according to the structures of cameras on which the lens is mounted, there are disposed various optical members GC. For example, there may be disposed a flat optical member such as a cover glass for protection of an imaging surface or an infrared ray cut filter.

The first lens G1 is a positive lens having a convex surface on the object side, for example, a double convex lens. The second lens G2 is a negative meniscus lens having a concave surface on the image side. The third lens G3 is a positive meniscus lens having a convex surface on the image side. The fourth lens G4 is a positive or negative lens having a concave surface on the image side and in the vicinity of the optical axis.

The image-side surface of the third lens G3 is convex in the vicinity of the optical axis and, preferably, the third lens G3 may have such a shape that the positive power thereof decreases as the distance from the optical axis Z1 increases. The fourth lens G4 may preferably be formed in such a manner that both surfaces thereof have an aspheric shape. The surface of the fourth lens G4 on the object side may preferably have a convex shape in the vicinity of the optical axis. The periphery of the object-side surface of the fourth lens G4 has such a shape that, for example, the positive power thereof decreases as the distance from the optical axis Z1 increases. Also, the periphery of the fourth lens G4 may also be formed such that, as the distance from the optical axis Z1 increases, the shape thereof changes from a convex shape to a concave shape and further changes into a convex shape. As regards the image-side surface of the fourth lens G4, preferably, it may provide a concave shape in the vicinity of the optical axis and may provide a convex shape in the periphery thereof.

This imaging lens satisfies the following formulae, $$vd1 > 50 \tag{1}$$

$$vd2 > 30 \tag{2}$$

$$|f2/f1| > 1 \tag{3}$$

$$0.5 < |f3/f4| < 1.5 \tag{4}$$

where vd 1: the Abbe number of the first lens; vd 2: the Abbe number of the second lens; f1: the focal length of the first lens; f2: the focal length of the second lens; f3: the focal length of the third lens; and, f4: the focal length of the fourth lens.

Next, description will be given below of the operation and effects of the above-structured imaging lens.

According to the imaging lens, not only the whole of the lens is composed of four lenses but also the materials of the lenses, the surface shapes of the lenses and the power distributions of the respective lenses are optimized; and thus, there can be obtained a high-performance lens system which can cope with the increased number of pixels and also can be made compact. In the imaging lens, by disposing the aperture stop St on the relatively forward side (on the object side) thereof, there is secured the telecentric characteristic. When the aperture stop St is disposed on the forward side of the imaging lens, the manufacturing sensitivity of the lens is enhanced, whereby, for example, when the lens is shifted in position, the image surface variation is easy to occur. However, according to the imaging lens, since the second lens G2 is formed in a negative meniscus shape having a concave surface on the image side, the image surface variation can be reduced to thereby be able to provide a lens system which is excellent in the manufacturing aptitude. Also, in the imaging lens, the surface of the fourth lens G4 on the image side is formed such that it has a concave shape in the vicinity of the optical axis and has a convex shape at the periphery thereof, which makes it possible to correct field curvature over the range extending from the central portion thereof to the peripheral portions thereof. Further, the present imaging lens is advantageous in securing the telecentric characteristic, and, over the range extending from the central portion of the image surface to the peripheral portions thereof, the incident angle of light rays onto the surface of an imaging element is allowed to be perpendicular to the imaging element surface.

According to the imaging lens, since the first lens G1 is made of a low-dispersion lens material which can satisfy the formula (1) and the second lens G2 is made of a high-dispersion lens material which can satisfy the formula (2), there can be provided a correction effect on the longitudinal chromatic aberration and the lateral color. When the imaging lens goes below the lower limit of the formula (1), mainly, the longitudinal chromatic aberration is increased, which unfavorably deteriorates the performance of the imaging lens. Also, when the imaging lens goes beyond the upper limit of the formula (2), mainly, the lateral color is increased, which unfavorably deteriorates the performance of the imaging lens. The upper limit of the formula (2) may preferably be equal to or lower than the following value.

$$vd\ 2 < 29 \quad (2A)$$

By satisfying the formulae (3) and (4), not only the telecentric characteristic can be provided and the longitudinal chromatic aberration and the lateral color can be corrected properly, but also the whole of the lens system can be made compact. The formula (3) regulates the proper power relationship between the two lenses (the first and second lenses G1 and G2) which are disposed on the object side. When the imaging lens goes below the lower limit of the formula (3), there is provided an advantage that the whole length of the lens system can be reduced, but the longitudinal chromatic aberration is increased, which unfavorably deteriorates the performance of the lens system. The formula (4) regulates the proper power relationship between the two lenses (the third and fourth lenses G3 and G4) disposed on the image side. When the imaging lens goes beyond the upper limit of the formula (4), the incident angle of light rays onto the surface of the imaging element is increased, which unfavorably worsens the telecentric characteristic of the lens system. On the other hand, when the imaging lens goes below of the lower limit of the formula (4), the entire length of the lens system can be advantageously shortened but the resultant lens system is unfavorably large in the longitudinal chromatic aberration and the lateral color.

As has been described above, according to the imaging lens of an embodiment, since the lens materials, the surface shapes of the lenses and the power distributions of the respective lenses are optimized, it is possible to realized a lens system which can deal with the increased number of pixels, can be made compact and can provide high performance.

Next, description of exemplary examples of the imaging lens according to the embodiment will be given below. In the following description, first to fourth examples will be discussed collectively.

FIGS. 5(A) and (B) respectively show the numeric value data on the imaging lens according to Example 1. Specifically, FIG. 5(A) shows the basic lens data thereof, while FIG. 5(B) shows the data on the aspheric surfaces thereof. In the column of surface numbers Si in the lens data shown in FIG. 5(A), there are shown the numbers of i-th surfaces to which reference characters are given in such a manner that the numbers of the reference characters sequentially increase as they approach the image side with the surface of a composing element nearest to the object as the first. In the column of radiuses of curvature Ri, there are shown the values (mm) of the radiuses of curvature of i-th surfaces arranged sequentially in order from the object side, while the values respectively correspond to the reference characters Ri given in FIG. 1. In the column of surface intervals Di as well, similarly, there are shown intervals (mm) on the optical axis between the i-th surface Si and the (i+1)-th surface Si+1 sequentially in order from the object side. Ndi shows the values of refractive indexes at the d-line (wavelength 587.6 nm) between mutually adjoining lens surfaces. In the column of vdj, there are shown Abbe numbers at the d-lines of j-th (j=1~5) optical elements sequentially in order from the object side.

In the imaging lens according to Example 1, both surfaces in each of the first lens G1, second lens G2, third lens G3 and fourth lens G4 are all formed in an aspheric surface. In the basic lens data shown FIG. 5(A), as the radiuses of curvature of these aspheric surfaces, there are shown the numeric values of the radiuses of curvature in the vicinity of the optical axis. As regards numeric values that are shown as aspheric surface data in FIG. 5(B), a reference character "E" expresses that a numeric value following the "E" is a power exponent having base 10 and also expresses that a numeric value expressed by an exponential function having base 10 is multiplied by a numeric value in front of the "E". For example, "1.0 E−02" expresses "1.0×10⁻²".

As the aspheric surface data, there are shown coefficients Bi and KA in the expression of aspheric surface shapes which are expressed by the following expression(A). Z expresses the length (mm) of a perpendicular dropped from a point on the aspheric surface at a position of height h from the optical axis Z1 down to the tangent plane of the apex of an aspheric surface. In the imaging lens according to Example 1, the respective aspheric surfaces are expressed effectively using third-degree (cubic) to tenth-degree coefficients B3 to B10 as aspheric surface coefficients Bi.

$$Z = C \cdot h^2 / \{1 + (1 - KA \cdot C^2 \cdot h^2)\}^{1/2} + \Sigma B_i \cdot h^i \quad (A)$$

(i=3~10)

where Z: the depth of an aspheric surface, h: the distance (height) (mm) from the optical axis to the lens surface, KA: a conic constant, C: a paraxial curvature=1/R, (R: a paraxial radius of curvature), and Bi: i-th degree aspheric surface coefficients.

Similarly to the imaging lens according to the above-mentioned Example 1, in FIGS. 6(A), 7(A) and 8(A), there are shown basic lens data on imaging lenses according to Examples 2 to 4. Also, similarly, in FIGS. 6(B), 7(B) and 8(B), there are shown data on aspheric surfaces relating to the imaging lenses according to Examples 2 to 4. By the way, in all of the imaging lenses according to Examples 2 to 4, both surfaces in their respective first lenses G1, second lenses G2, third lenses G3 and fourth lenses G4 are all formed in an aspheric shape.

FIG. 9 shows values relating to the above-mentioned formulae. By the way, in FIG. 9, a reference character "f" expresses a paraxial focal distance (mm) for all lens systems. Reference characters f1, f2, f3 and f4 respectively express the paraxial focal distances (mm) of the first lenses G1, second lenses G2, third lenses G3 and fourth lenses G4. As can be seen from FIG. 9, the values of the respective embodiments are within the range of the numeric values of the respective formulae.

FIGS. 10(A) to 10(C) respectively show the spherical aberration, astigmatism (field curvature) and distortion (distortion aberration) of the imaging lens according to Example 1. In the respective aberration figures, there are also shown aberrations at the C-line (wavelength of 656.27 nm) and the F-line (wavelength of 486.13 nm), with the d-line as their reference wavelength. In the astigmatism view, a reference character S expresses an aberration in a sagittal direction, while T expresses an aberration in a tangential direction. A reference character ω expresses a half angle of view. By the way, in FIG. 10(A), the vertical direction expresses an entrance pupil diameter (mm).

Figure 11C:
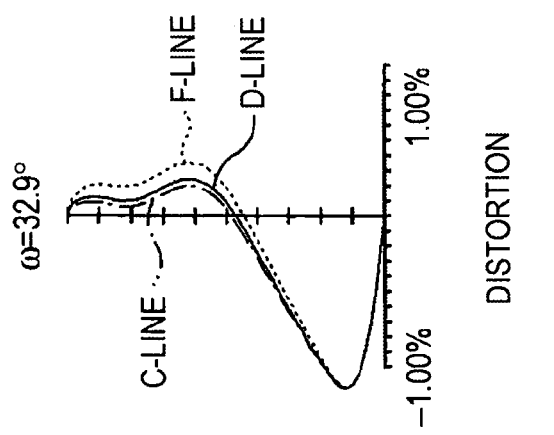
Figure 11B:
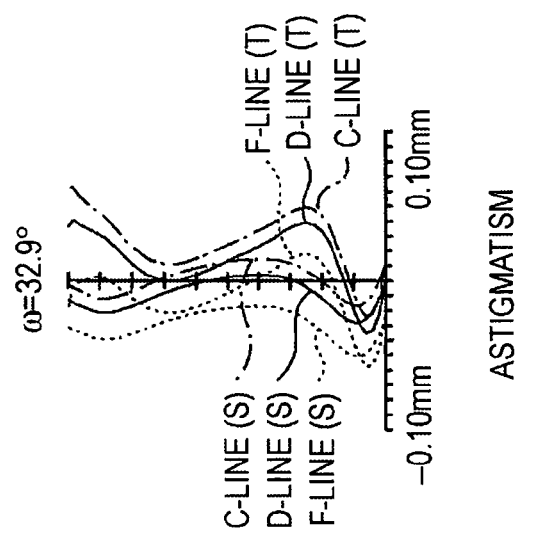
Figure 11A:
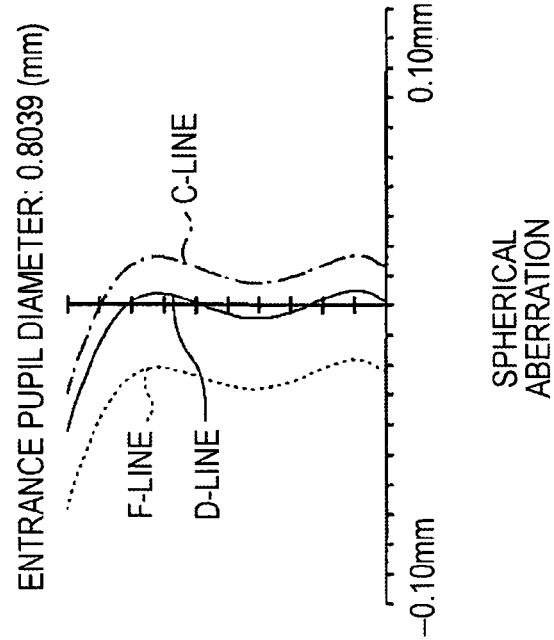
Figure 12C:
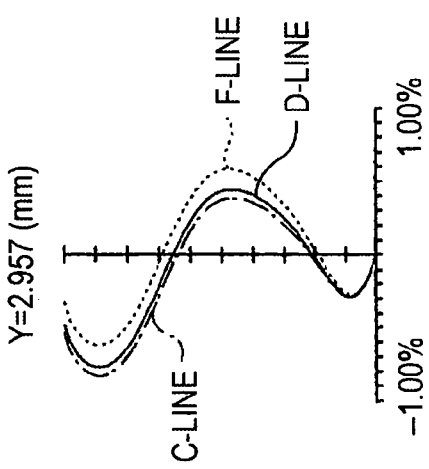
Figure 12B:
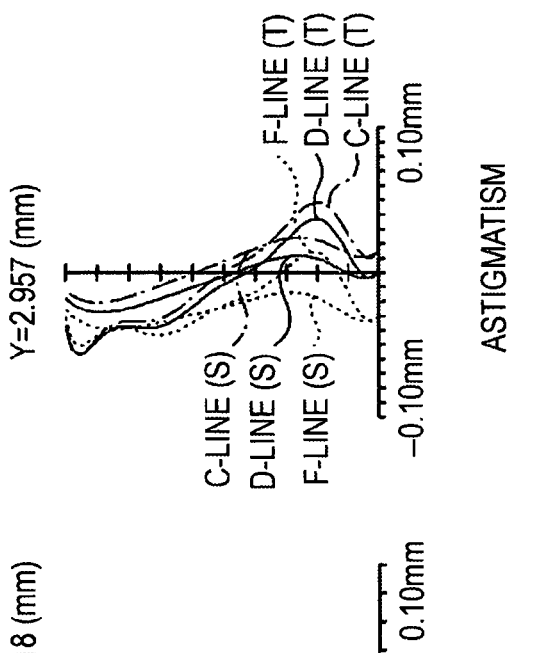
Figure 12A:
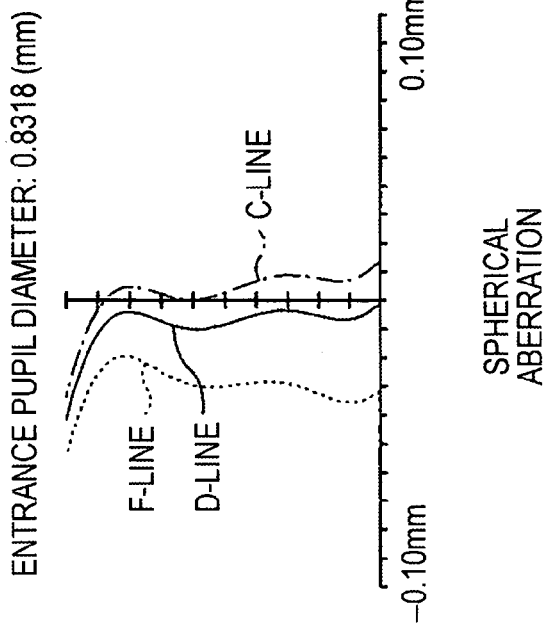
Figures 13A, 13B, 13C:
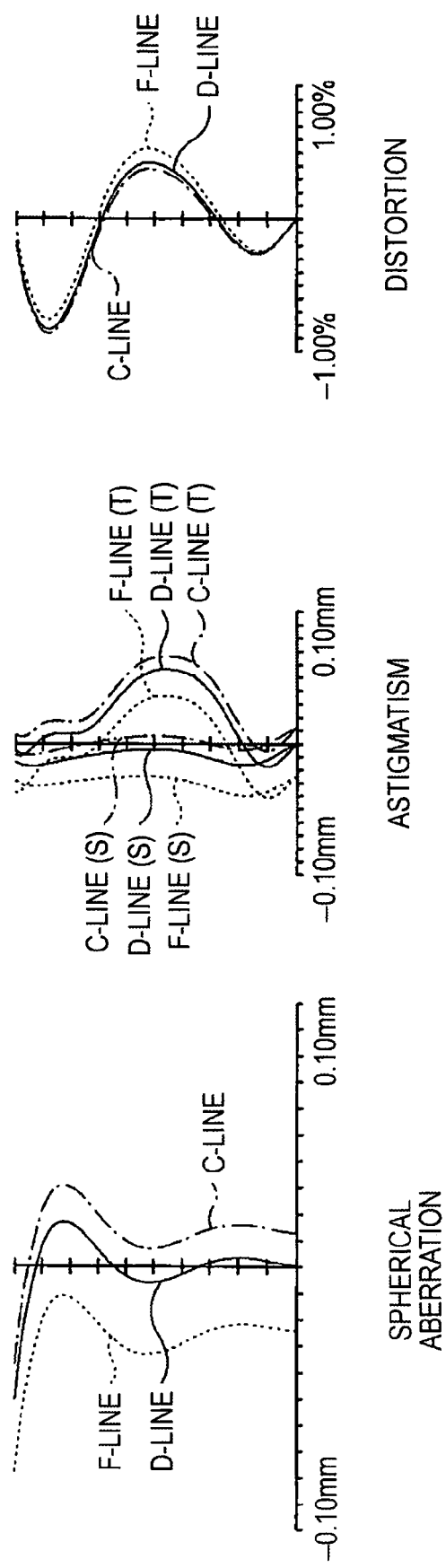

Similarly, FIGS. 11(A) to (C) respectively show the respective aberrations relating to the imaging lens according to Example 2, FIGS. 12(A) to (C) respectively show the respective aberrations relating to the imaging lens according to Example 3, and FIGS. 13(A) to (C) respectively show the respective aberrations relating to the imaging lens according to Example 4. By the way, in FIGS. 12(B), (C) and FIGS. 13(B), (C), the vertical direction expresses an image height Y (mm).

As can be understood from the above-mentioned respective numeric value data and from the respective aberration views, in the respective embodiments, there can be realized lens systems each of which is composed of four lenses, and can optimize the lens materials, the surface shapes of the lenses and the power distributions of the respective lenses, thereby being able to reduce the size thereof and provide high performance.

By the way, the present invention is not limited to the above-mentioned embodiments, but the invention can also be enforced in other various modified embodiments. For example, the values of the radiuses of curvature, surface intervals and refractive indexes of the respective lens components are not limited to the values shown in the above-mentioned respective numeric value embodiments, but there can also be employed other values.

This application claims foreign priority from Japanese Patent Application No. JP2006-38115, filed Feb. 15, 2006, the entire disclosure of which is herein incorporated by reference.

What is claimed is:

1. An imaging lens comprising: in order from an object side of the imaging lens,
   a first lens of a positive lens having a convex surface on the object side thereof;
   a second lens of a negative lens in a meniscus shape having a concave surface on an image side thereof;
   a third lens of a positive lens in a meniscus shape having a convex surface on the image side thereof; and
   a fourth lens of a positive or negative lens, wherein both surfaces of the fourth lens are aspheric and the fourth lens has a concave surface on the image side in a vicinity of an optical axis of the fourth lens,
   wherein the imaging lens satisfies formulae (1) to (4):

$$vd1 > 50 \quad (1)$$

$$vd2 < 30 \quad (2)$$

$$|f2/f1| > 1 \quad (3)$$

$$0.5 < |f3/f4| < 1.5 \quad (4)$$

wherein
   vd 1 represents an Abbe number of the first lens;
   vd 2 represents an Abbe number of the second lens;
   f1 represents a focal length of the first lens;
   f2 represents a focal length of the second lens;
   f3 represents a focal length of the third lens; and
   f4 represents a focal length of the fourth lens.

2. The imaging lens according to claim 1, further comprising an aperture stop disposed nearer to an object than an image-side surface of the first lens.

3. The imaging lens according to claim 2, wherein The fourth lens has an image-side surface that is concave in The vicinity of the optical axis and convex at the periphery of the fourth lens.

4. The imaging lens according to claim 1, further comprising an aperture stop disposed between the first and second lenses.

5. The imaging lens according to claim 4, wherein the fourth lens has an image-side surface That is concave in the vicinity of the optical axis and convex at the periphery of the fourth lens.

6. The imaging lens according to claim 1, wherein the fourth lens has an image-side surface that is concave in the vicinity of the optical axis and convex at the periphery of The fourth lens.

7. The imaging lens according to claim 1, further comprising an imaging element and an optical member or infrared ray cut filter disposed between said fourth lens and said imaging element.

8. The imaging lens according to claim 1, wherein said first lens is a double convex lens.

9. The imaging lens according to claim 1, wherein the image-side surface of said third lens is convex in the vicinity of the optical axis and said third lens has a shape so that the positive power thereof decreases as The distance from the optical axis increases.

10. The imaging lens according to claim 1, wherein the surface of said fourth lens on the object side has a convex shape in the vicinity of the optical axis.

11. The imaging lens according to claim 10, wherein the periphery of the object-side surface of said fourth lens has such a shape so that a positive power thereof decreases as the distance from the optical axis increases.

12. The imaging lens according to claim 10, wherein a periphery of said fourth lens is formed such that, as the distance from the optical axis increases, the shape thereof changes from a convex shape to a concave shape and further changes into a convex shape.

13. The imaging lens according to claim 1, wherein said imaging lens secures a telecentric characteristic and, over a range extending from a central portion of an image surface to peripheral portions thereof, an incident angle of light rays onto the surface of an imaging element is perpendicular to said imaging element surface.

14. The imaging lens according to claim 1, wherein said second lens satisfies formula (2A):

$$vd2 < 29 \quad (2A).$$

15. The imaging lens according to claim 1, wherein both surfaces in each of said first lens, second lens and third lens are aspheric surfaces.

16. An imaging lens comprising: in order from an object side of the imaging lens,
   a first lens of a positive lens having a convex surface on the object side thereof;
   a second lens in a meniscus shape having a concave surface on an image side thereof;
   a third lens in a meniscus shape having a convex surface on the image side thereof; and
   a fourth lens, wherein both surfaces of the fourth lens are aspheric and the fourth lens has a concave surface on the image side in a vicinity of an optical axis of the fourth lens,
   wherein the imaging lens satisfies formulae (1) to (4):

$$vd1 > 50 \quad (1)$$
   $$vd2 < 30 \quad (2)$$
   $$|f2/f1| > 1 \quad (3)$$
   $$0.5 < |f3/f4| < 1.5 \quad (4)$$

wherein
   vd 1 represents an Abbe number of the first lens;
   vd 2 represents an Abbe number of the second lens;
   f1 represents a focal length of the first lens;
   f2 represents a focal length of the second lens;
   f3 represents a focal length of the third lens; and
   f4 represents a focal length of the fourth lens.

17. The imaging lens according to claim 16, further comprising an aperture stop disposed nearer to an object than an image-side surface of the first lens.

18. The imaging lens according to claim 17, wherein the fourth lens has an image-side surface that is concave in the vicinity of the optical axis and convex at the periphery of the fourth lens.

19. The imaging lens according to claim 16, further comprising an aperture stop disposed between the first and second lenses.

20. The imaging lens according to claim 19, wherein the fourth lens has an image-side surface that is concave in the vicinity of the optical axis and convex at the periphery of the fourth lens.

21. The imaging lens according to claim 16, wherein the fourth lens has an image-side surface that is concave in the vicinity of the optical axis and convex at the periphery of the fourth lens.

22. The imaging lens according to claim 16, wherein the image-side surface of said third lens is convex in the vicinity of the optical axis and said third lens has a shape so that the positive power thereof decreases as the distance from the optical axis increases.

23. The imaging lens according to claim 16, wherein the surface of said fourth lens on the object side has a convex shape in the vicinity of the optical axis.

24. The imaging lens according to claim 16, wherein said second lens satisfies formula (2A):

$$vd2 < 29. \quad (2A)$$

25. The imaging lens according to claim 16, wherein both surfaces in each of said first lens, second lens and third lens are aspheric surfaces.

26. An imaging lens comprising: in order from an object side of the imaging lens,
   a first lens of a positive lens having a convex surface on the object side thereof;
   a second lens of a negative lens in a meniscus shape having a concave surface on an image side thereof;
   a third lens of a positive lens in a meniscus shape having a convex surface on the image side thereof; and
   a fourth lens of a positive or negative lens, wherein the fourth lens has a concave surface on the image side in a vicinity of an optical axis of the fourth lens,
   wherein the imaging lens satisfies formulae (1) to (4):

$$vd1 > 50 \quad (1)$$
   $$vd2 < 30 \quad (2)$$
   $$|f2/f1| > 1 \quad (3)$$
   $$0.5 < |f3/f4| < 1.5 \quad (4)$$

wherein
   vd 1 represents an Abbe number of the first lens;
   vd 2 represents an Abbe number of the second lens;
   f1 represents a focal length of the first lens;
   f2 represents a focal length of the second lens;
   f3 represents a focal length of the third lens; and
   f4 represents a focal length of the fourth lens.

27. An imaging lens comprising: in order from an object side of the imaging lens,
   a first lens of a positive lens having a convex surface on the object side thereof;
   a second lens of a negative lens in a meniscus shape having a concave surface on an image side thereof;
   a third lens of a positive lens in a meniscus shape having a convex surface on the image side thereof; and
   a fourth lens of a positive or negative lens, wherein both surfaces of the fourth lens are aspheric and the fourth lens has a concave surface on the image side in a vicinity of an optical axis of the fourth lens,
   wherein the imaging lens satisfies formulae (1) to (4):

$$vd1 > 50 \quad (1)$$
   $$vd2 < 29 \quad (2A)$$
   $$|f2/f1| > 1 \quad (3)$$
   $$0.5 < |f3/f4| < 1.5 \quad (4)$$

wherein
   vd 1 represents an Abbe number of the first lens;
   vd 2 represents an Abbe number of the second lens;
   f1 represents a focal length of the first lens;
   f2 represents a focal length of the second lens;
   f3 represents a focal length of the third lens; and
   f4 represents a focal length of the fourth lens.

28. The imaging lens according to claim 27, wherein both surfaces in each of said first lens, second lens and third lens are aspheric surfaces.

29. The imaging lens according to claim 27, further comprising an aperture stop disposed nearer to an object than an image-side surface of the first lens.

30. The imaging lens according to claim 27, further comprising an aperture stop disposed between the first and second lenses.

31. An imaging lens comprising: in order from an object side of the imaging lens,
   a first lens of a positive lens having a convex surface on the object side thereof;
   a second lens of a negative lens in a meniscus shape having a concave surface on an image side thereof;
   a third lens of a positive lens in a meniscus shape having a convex surface on the image side thereof; and a fourth lens of a positive or negative lens, wherein both surfaces of the fourth lens are aspheric and the fourth lens has a concave surface on the image side in a vicinity of an optical axis of the fourth lens, wherein the imaging lens satisfies formulae (3) to (4):

$$|f2/f1|>1 \qquad (3)$$

$$0.5<|f3/f4|<1.5 \qquad (4)$$

wherein f1 represents a focal length of the first lens;

f2 represents a focal length of the second lens;

f3 represents a focal length of the third lens; and f4 represents a focal length of the fourth lens.

* * * * *